United States Patent [19]

House et al.

[11] Patent Number: 5,166,185
[45] Date of Patent: Nov. 24, 1992

[54] CHLOROFLUOROCARBON-FREE FLEXIBLE POLYURETHANE FOAMS AND METHOD OF MAKING WITH BLOWING EFFICIENCY ENHANCERS

[75] Inventors: David W. House, Arlington Heights; Ray V. Scott, Jr., Addison; Mark J. Gattuso, Palatine, all of Ill.

[73] Assignee: UOP, Des Plaines, Ill.

[21] Appl. No.: 533,981

[22] Filed: Jun. 6, 1990

[51] Int. Cl.$^5$ .............................................. C08G 10/32
[52] U.S. Cl. .................................... 521/159; 521/163; 521/170; 520/68
[58] Field of Search ...................... 521/163, 159, 170; 528/68

[56] References Cited

U.S. PATENT DOCUMENTS

| | | | |
|---|---|---|---|
| 3,846,351 | 11/1974 | Huffaker et al. | 528/64 |
| 3,909,464 | 9/1975 | Anorga et al. | 521/163 |
| 4,367,295 | 1/1983 | von Bonin | 528/71 |
| 4,433,067 | 2/1984 | Rice et al. | 521/51 |
| 4,578,446 | 3/1986 | House et al. | 528/64 |
| 4,722,989 | 2/1988 | Starner et al. | 528/64 |
| 4,801,674 | 1/1989 | Scott, Jr. et al. | 528/68 |
| 4,845,133 | 7/1989 | Priester, Jr. et al. | 521/167 |
| 4,910,231 | 3/1990 | Pham et al. | 521/159 |
| 5,034,427 | 7/1991 | Frigo et al. | 521/163 |
| 5,043,360 | 8/1991 | Pham et al. | 521/159 |
| 5,084,486 | 1/1992 | Patten et al. | 521/126 |

FOREIGN PATENT DOCUMENTS 1412818 11/1975 United Kingdom .

OTHER PUBLICATIONS

Woods, *Flexible Polyurethane Foams*, Applied Science Publishers, 1982, pp. viii, 16-25, 150, 153, 315.

Gattuso et al, *Secondary Amine Extended Flexible Polyurethane-Urea Foams*, Polyurethanes 88, Proceedings of the S.P.I. 31st Annual Technical/Marketing Conference, Oct. 19-21, 1988.

*Primary Examiner*—John Kight, III
*Assistant Examiner*—John M. Cooney, Jr.
*Attorney, Agent, or Firm*—Thomas K. McBride; John F. Spears, Jr.; Jack H. Hall

[57] ABSTRACT

N,N'-di-sec-alkenyl-or-di-sec-alkyl-substituted methylene diphenyl diamines are effective curing agents for making polyurethane foams from MDI-based polyisocyanates. The diamines are especially advantageous since foams of lower density having lower hardness can be obtained without utilizing chlorofluorocarbous (CFC's) and without sacrificing tensile strength, tear strength, SAG or compression set values.

18 Claims, 5 Drawing Sheets

CHLOROFLUOROCARBON-FREE FLEXIBLE POLYURETHANE FOAMS AND METHOD OF MAKING WITH BLOWING EFFICIENCY ENHANCERS

FIELD OF THE INVENTION

This invention relates to the art of making flexible polyurethane foams having low density and low hardness without the necessity of incorporating chlorofluorocarbons into the formulation.

BACKGROUND OF THE INVENTION

Polyurethanes are a well-known class of commercially available polymers. Polyurethane foams have great versatility and many formulations and manufacturing processes have been developed to take advantage of these properties. Most of the flexible foams, to which the invention relates, are made with toluene diisocyanate (TDI) and, while pure methylene diphenyl diisocyanate (MDI) has found applications in rigid foams, high resilience self-skinning molded flexible foams and cold-cured quick demolding foams for furniture cushions, other attempts at developing flexible foam using MDI, methylene-bridged polyphenylene polyisocyanate (PMDI), modified MDI and even TDI/MDI mixtures have not been as successful. See Woods, *Flexible Polyurethane Foams* Applied Science Publishers, 1982, pages viii, 16-25, 150, 153,315.

A blowing agent is necessary for making foams. The primary blowing agent in most foams is water and the foam density decreases with increased water, with amounts up to about 5 parts per hundred polyol. However, hardness also increases as the level of water increases. In furniture and auto cushions, however, it is sometimes desirable to have both a density decrease and a hardness decrease, without significantly lowering other properties of the foam, for reasons of cost and comfort. Presently, this is accomplished, in MDI- and TDI-based foams, through use of an auxiliary blowing agent, a chlorofluorocarbon, primarily F-11. Since the use of chlorofluorocarbons (CFC's) have been linked to depletion of ozone in the atmosphere, determined efforts are being made to reduce the use of CFC's. It is accordingly an object of the invention to produce a polyurethane foam of low density and hardness, comparable to CFC-obtained foams, without employing any CFC's in the formulations for making flexible foams.

Replacements for CFC's are being developed as the CFC's are phased out. For example, hydrochlorofluorocarbons (HCFC's) which can also be used as blowing agents for polyurethane foams and are not believed to be as damaging to the earth's atmosphere as CFC's, may be used until completely harmless blowing agents are discovered. The discovery of applicants can be used in conjunction with CFC's and/or HCFC's to produce a cumulative effect on the density of the foams produced to achieve ultimate densities lower than produced with only CFC's or HCFC's. Where the term "CFC" is used herein, HCFC's are also intended.

Secondary amines have previously been proposed as curing agents for TDI-based polyurethane foams, Gattuso et al *Secondary Amine Extended Flexible Polyurethane-Urea Foams*, Polyurethanes 88, Proceedings of the S.P.I. 31st Annual Technical/Marketing Conference, Oct. 19-21, 1988. However, with TDI-based foams (including those blended with substantial amounts of MDI-based isocyanates), the hardness (as measured by Indent Force Deflection (IFD) or Compression Force Deflection (CFD)) increases with increasing amounts of the secondary amines. The data thus indicates that these secondary amines would not be useful as a substitute for CFC in polyurethane flexible foams. It was entirely unexpected that the secondary diamines of the invention could be used to make MDI-based foams without any CFC's which would have low density and low hardness, comparable to those made with CFC's.

British Patent 1,412,818 discloses the use of asymmetrical aromatic diamines (mixed with varying amounts of coreactant symmetrical aromatic diamines) for making MDI- or TDI/MDI-based polyurethane foams. The disclosure does not relate to CFC-produced foams and, in fact, the MDI-based foams produced (Examples 8 and 15 of the patent) exhibited either the same or increased density as those produced without the diamines.

U.S. Pat. No. 3,846,351 describes the use of secondary phenylene diamines in combination with polyols as catalysts and chain extenders in the production of flexible polyurethane foams. More recently, it has been shown in U.S. Pat. No. 4,578,446 to House et al. that, contrary to the prior conventional wisdom, N-alkylated methylenedianilines are suitable curing agents for urethane prepolymers, i.e., in elastomer production via non-RIM processes. In U.S. Pat. No. 4,801,674, to Scott, et al., N-alkylated methylene dianilines are disclosed as suitable curing agents for RIM applications. However, neither patent discloses the unexpected and extremely beneficial results achieved with the present invention.

SUMMARY OF THE INVENTION

The object of this invention is a CFC-free flexible polyurethane foam having a density below 3.0 pcf, and preferably from about 0.8 to about 3.0 pcf, hardness values, based on CFD, hereinafter defined of from about 0.2 to about 0.75 psi at 25% deflection and about 1.0 to 2.0 psi at 65% deflection, incorporating N,N'-di-sec- or tert-alkyl- or N,N'-di-sec- or tert-di-alkenylsubstituted methylene diphenyl diamines. In a preferred embodiment, the substituted aromatic diamines are symmetrical. In one embodiment of the preferred diamine, the substituted aromatic diamine is an N-alkylated methylene dianiline where each alkyl group contains from 3 to about 20 carbon atoms. In a more specific embodiment, the alkyl group contains from 4 up to about 10 carbon atoms. In a still more specific embodiment, the alkyl is a secondary alkyl group, containing up to about 20 carbon atoms, preferably from 4 to about 10 carbon atoms.

Another object of the invention is a method for making a low density polyurethane foam having a density below 3.0 pcf, and a compression force deflection value (CFD) at 25% of about 0.2 to about 0.75, without the addition of chlorofluorocarbons, comprising reacting an MDI-based composition consisting of at least 90 wt. % of (a) one or more organic polyisocyanates selected from the group consisting of methylene diphenyl diisocyanate (MDI), a polymer of methylene diphenyl diisocyanate (PMDI) and derivatives thereof or mixtures thereof, (b) a backbone component selected from the group consisting of polyols (c) water from 1 to 5 php and (d) from about 1 to 9 parts per hundred (php) by weight, preferably about 2 to 7 php, based on 100 parts of total backbone polyol, of an N,N'-disubstituted aromatic diamine of the structure,

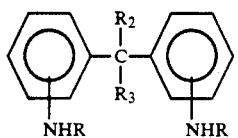

where R is selected from the group consisting of a monovalent sec- or tert- alkyl, alkenyl moiety containing from 3 to about 20 carbon atoms, or a monovalent aryl moiety from 6 to about 10 carbon atoms, $R_2$ is H or $C_1$, $C_2$ or $C_3$ alkyl and $R_3$ is H or $C_1$ to $C_6$ alkyl.

DESCRIPTION OF THE INVENTION

Figure 1:
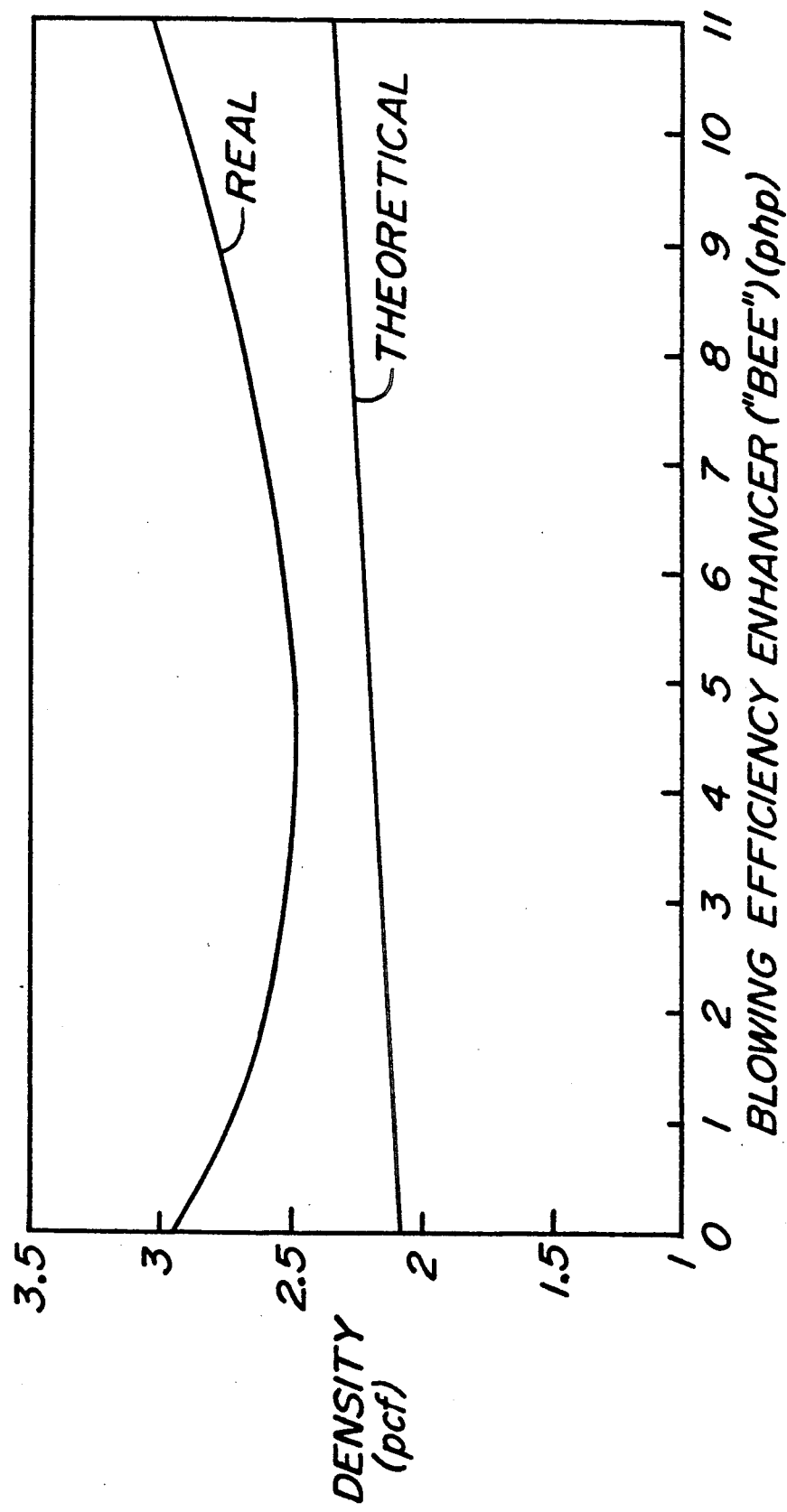
FIG. 1 is a plot of theoretical and observed density vs. the level of the blowing efficiency enhancer of the invention with data from Example II.

Although N,N' substituted methylene diphenyl diamines have been used as the curing agents in polyurethane foams, we have found that certain members of the class of aromatic diamines can be used in the preparation of polyurethane foams having properties heretofore requiring CFC's. The foams of the invention are MDI-based and exhibit low densities and hardness values comparable to both TDI- and MDI-based flexible foams utilizing CFC's as auxiliary blowing agents. Among the advantages of the isocyanate reactive diamines of this invention are that the resulting foams can be expected to exhibit low density and decreased hardness, as measured by compression force deflection (CFD) or indentation force deflection (IFD). The properties attained by the foams of the invention make these foams useful in a number of applications for foams, especially molded parts, e.g. auto seat cushions and armrests, headliners, door liners, etc. Other significant characteristics of the foams, such as tear resistance, SAG factor, a measure of the "comfort" of a foam, such as a seat cushion, compression set, tear strength, tensile strength, etc., are essentially unchanged. Heretofore, this combination of properties has not been achieved, except through the use of CFC's. Therefore, it was totally unexpected that lowered hardness could be obtained along with reduced density without employing CFC's.

Polyurethane foams may be prepared in a two-stage process by curing urethane prepolymers or quasi-polyisocyanate prepolymers (adducts of polyisocyanates and polyhydric alcohols), but foam production is normally accomplished by a one-shot process. Virtually all polyurethane foams are presently formed via the one-shot process, in which a polyisocyanate and the polyol are brought together simultaneously with other reactants, and optionally, other chain extenders or chain terminators, catalysts, blowing agents, surfactants, etc., without preforming an initial prepolymer, although, due to the relative speeds of the competing reactions, compounds referred to as a prepolymer in either of the 2-stage processes just referred to may be formed. Non-reactive ingredients may be premixed to reduce the number of streams to the mixing head that are required.

In the reaction, the terminal isocyanate groups react with the active hydrogens of a polyfunctional compound, e.g., polyols or polyamines, so as to form high polymers through chain extension and, to some extent, cross-linking. Such cross-linking occurs primarily through three mechanisms: 1) through reaction of the amine, generated in the $CO_2$ gas-forming reaction between the isocyanate and water present, with more isocyanate, to form a di-substituted urea, which reacts further with isocyanate to form highly cross-linked biurets; 2) through the reaction of the urethane formed as the primary reaction product with an additional molecule of isocyanate to form an allophanate and 3) through the reaction with trifunctional (or higher) polyols and/or cross-linkers. In all cases, a suitable blowing agent is used. Water is the primary blowing agent, but an auxiliary, hereafter sometimes referred to as a "blowing efficiency enhancer" ("BEE") are used to obtain other properties of concern in the present invention. Chlorofluorocarbons (CFC's) are conventionally used as an auxiliary blowing agent in making flexible foams where a softer, less hard, product is desired, as for furniture and car seats, mattresses, carpet underlay, etc. Foams with lower density and lower hardness cannot be obtained with carbon dioxide alone, since the necessary increase in water level requires a greater amount of isocyanate, which leads to an increased number of urea groups in the polymer structure and altered foam properties. Also, the amount of water is limited by the exotherm generated, on account of processability, to about 4 or 5 parts by weight per hundred parts of polyol.

Numerous published studies, however, have linked the use of CFC's to the loss of ozone in the atmosphere and possible destruction of the earth's protective ozone layer. It is thus a current global priority to reduce and eventually eliminate all CFC uses, implemented by laws restricting their use.

In order to eliminate CFC's from foams, replacements such as HCFC's which will act as a blowing agent to lower the density of the foam sufficiently and also lower the hardness of the foam, are being investigated. The present invention, however, does not rely upon replacing the CFC or HCFC, but we have unexpectedly found that we can achieve the same results, i.e. lower density and lower hardness, by more efficient utilization of the $CO_2$ formed by the reaction of water and an isocyanate.

The polyisocyanates that may be used in the preparation of the polyurethane foams of the invention are the methylene diphenyl diisocyanates, such as 3,3'-dimethyl-4,4'-diphenylmethane diisocyanate, methylene-4,4'-diphenyldiisocyanate (MDI), methylene-bridged polyphenylene polyisocyanates (PMDI) and modified MDI's, e.g., the carbodiimide or the uretone imine derivatives and mixtures thereof. The carbodiimide and uretone imine-modified MDI are described in U.S. Pat. No. 4,433,067. The term "MDI" or MDI-based" is used hereinafter in a collective sense, meaning all of the polyisocyanates falling within the above definition. Furthermore, while the invention is best practiced with substantially pure MDI's from those listed above, the same advantages may accrue with minor amounts (say, up to about 10% by weight of the total diisocyanate in the formulation) of other diisocyanates blended with the MDI. However, from the data available, it is believed that the desirable properties achieved by the invention will be reduced, as the amount of non-MDI diisocyanate is increased. Preferably, the diisocyanate will be at least 90% MDI-based. The polyisocyanates also include quasi prepolymers of polyisocyanates formed from MDI with active hydrogen containing materials where the polyisocyanate is typically reacted with from about 0.05 to about 0.3 equivalents of a polyol. An equivalent of a polyol is the weight of polyol which furnishes as many hydroxyl groups as there are isocyanate groups in the mixture.

The backbone polyols used in foams are equally well known, and may have molecular weights of 150 to 8000. The backbone polyols used for the flexible foams of the invention are trihydric polyols sometimes referred to as triols herein and to a lesser extent, dihydric polyols, sometimes called diols, and tetrahydric polyols.

The backbone polyol used is represented by the structural formula, HO—Z—OH, is the source of active hydrogen for the MDI-based foams and has a molecular weight of 150 to 8000. Z may be a divalent alkyl radical (i.e., an alkylene group), and may contain additional hydroxyl groups. The polyols frequently are ethers, or sometimes esters, which are the condensation products of glycols with alkylene oxides or dicarboxylic acids, respectively. The formula, above, for a diol is used for clarity, but triols are most frequently used, sometime mixed with diols, in making flexible foams. Examples of suitable backbone polyols include poly(ethyleneoxy) glycols, derived from such glycols as dipropylene glycol or glycerol; poly(propyleneoxy) glycols, derived from such glycols as dibutylene glycol or glycerol; and poly(butyleneoxy) glycols, generally, etc.

One reason that polyhydric alcohols generally have gained acceptance is that their reaction with polyisocyanates is sufficiently fast to be convenient, but not so fast as to make it difficult to work with the resulting polymer. In producing foams, it is desirable that the cream time be reasonably short, yet long enough for the material to be injected into molds or poured onto the conveyor. The material must also be fluid long enough for suitable foaming to occur (rise time).

Short chain polyols and polyamines, conventionally employed as chain extenders and cross-linkers, can be used in making foams of the invention. Difunctional substances, such as glycols, diamines and hydroxyamines function as chain extenders and are commonly used in flexible foams. Exemplary diol chain extenders include ethylene glycol, diethylene glycol, propylene glycol, dipropylene glycol, 1,4-butane diol, polypropylene glycol. Diamine chain extenders which have been used include m-phenylene diamine and diethyltoluenediamine. Diethanolamine is a preferred hydroxyamine cross-linker.

In polyurethane foams, the reactants are brought together in the presence of other components such as catalysts, pigments or fillers, surfactants, flame retardants, bacteriostats and cell openers. As mentioned previously, these foams may be prepared as two-component systems using MDI-based polyisocyanate prepolymers or quasi-polyisocyanate prepolymer, but preferably, as one-shot systems using MDI-based polyisocyanates (including polymeric isocyanates).

The foam is made by reacting the MDI-based polyisocyanate with a long chain, or "backbone", polyol, from about 1 to about 5 parts water per hundred parts by weight of total polyol ("php") and from about 2 to 7 php of at least one N,N'-disubstituted methylene diphenyl diamine of the structure,

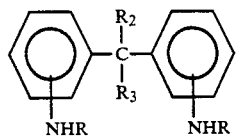

and, optionally, a short chain polyol. The R groups in the N,N'-di-substituted methylenediphenyl diamine are sec- or tert- alkyl or sec- or tert- alkenyl i.e., a monovalent radical whose parent is a branched alkane or alkene selected from the group consisting of branched alkyl or alkenyl moieties containing from 3 up to about 20 carbon atoms and more preferably between 4 and about 12 carbon atoms, especially those containing from 4 through about 8 carbon atoms. The branched alkyl or alkenyl group may be a secondary or tertiary group, although when it is tertiary there is the risk that the size and/or shape of the molecule may prevent the formation of the substituted urea group due to hindrance or the reaction may be too slow to result in a suitable foam product. Secondary alkyl groups are preferred, and among these the secondary butyl group is particularly preferred. Examples of secondary and tertiary alkyl groups which may be used in the practice of this invention include iso-propyl,-sec-butyl, sec-pentyl, sec-hexyl, sec-heptyl, sec-octyl, sec-nonyl decyl, sec-undecyl, sec-dodecyl, sec-tridecyl, sec-tetradecyl, sec-pentadecyl, sec-hexadecyl, sec-heptadecyl, sec-octadecyl, sec-nonadecyl, and sec-eicosyl moieties. Examples of sec-alkenyl groups are the unsaturated counterparts of the aforementioned alkyl groups. As stated previously, tertiary alkyl or alkenyl groups, i.e., those which are fully substituted at the carbon atom bound to the nitrogen may be useful in the practice of this invention. $R_2$ is H or $C_1$, $C_2$ or $C_3$ alkyl and $R_3$ is H or $C_1$ to $C_6$ alkyl.

The reaction times, such as cream time, rise time, and gel or tack-free time, will depend not only on the nature of the N,N'-disubstituted diamine, but also will depend on the presence of other components, e.g., catalysts or other chain extending agents, and the nature of such catalysts or other chain extenders. For example, in general, it will be found that secondary alkyl- and secondary alkenes will give faster reaction times than their tertiary counterpart.

CFC's and HCFC's contribute to lowered density in polyurethane foam by increasing the amount of volatiles or gaseous material which is subsequently trapped in the bubbles or pores. They do not, however, enter into the reaction and therefore, the molecular structure of the polyurethane is not changed, but the desirable result of lower density and lower hardness is nevertheless obtained.

On the other hand, the secondary diamines of the invention, enter in the reaction with the diisocyanate to form substituted ureas. When the secondary diamine reacts with MDI- or PMDI, a substituted urea is formed. The carbonyl group of the substituted urea cannot form hydrogen bonds, as is the case with the similar reaction between primary amines or less hindered substituted amines and diisocyanates, apparently due to steric hindrance caused by the R group on the amine in the diamines of the invention. It is theorized that this structural difference resulting from the reaction or from the exotherm caused by the reaction is responsible for the unique properties of the product foam. However, it has been determined experimentally that the blowing efficiency, defined hereinafter, of the $CO_2$ produced by the water in the polyurethane formulation is increased with our new formulations, which include MDI-based diisocyanates and the secondary diamines having hydrogen-bonding inhibiting steric hindrance.

Blowing efficiency can be regarded as a measure of the percentage of the volatile materials, produced in the polyurethane reaction or added to the formulation, that are retained in the polyurethane mass until the mass reaches the point in the reaction where minimum density is reached (the "rise" time). We believe that, by our invention, the point where the polyurethane has gelled so that the loss of volatile materials is substantially decreased is reached sooner, resulting in less of the volatile materials being lost to the atmosphere by gel time. Thus, lower densities can be realized. In quantitative terms, blowing efficiency can be expressed by the equation:

$$\text{Blowing Efficiency} = \frac{1/D_{obs.}}{1/D_{theo}} \times 100 = \frac{D_{theo}}{D_{obs}} \times 100$$

where $D_{obs}$ is the observed, or actual, density of the foam and $D_{theo}$ is the theoretical density of the foam, assuming that all the $CO_2$ generated contributes to the final density. The theoretical density is the density expected if the $CO_2$ generated in the reaction was completely efficient in its blowing of the foam. $D_{theo}$ is calculated from the following equation, combining standard density calculations with the ideal gas law:

$$\text{Foam Density} = \frac{(\text{kg components})}{\frac{(\text{kg components})}{(\text{avg density of components})} + \text{volume of gas}}$$

where "kg components" is the mass of the material used in the formulation. "Kg components" divided by the average density of the components represents the volume of the material. The amount of $CO_2$ lost from this volume is minor compared to the total volume; therefore, this loss is ignored. The average density of the components was about 1.0 kg/L. The "Volume of Gas" is the number of liters of $CO_2$ gas produced by the water when reacting with the isocyanate plus the amount of additional gas produced by volatilization. The total amount of gas is corrected to STP using the ideal gas law to adjust for temperature. An assumption is made that the pressure in the foam is equal to the pressure outside of the foam arriving at the equation:

$$\text{Volume of Gas} = (\text{total \#moles gas})(22.4\ L)(T_2/T_1),$$

where $T_1$ is ambient temperature and $T_2$ is the temperature of the foam when the rise time is reached.

The data from Example II was used in FIG. 1 to plot the observed density and theoretical density versus the amount (parts per hundred parts of polyol) of the "Blowing Efficiency Enhancer" of the invention ("BEE") in the formulation. When the level of "BEE" is increased from 0 to 11, the density quickly decreases from about 3.0 pcf to about 2.5 pcf at 3 php "BEE"; at about 5.5 php "BEE", the density begins to increase again reaching the original value of 3.0 pcf at about 10.5 php "BEE". Thus, the best density with this formulation is obtained with about 3 to 6 php "BEE" in the formulation. Adjustments in the other ingredients may be made in order to optimize the advantages.

The lower curve shows that the theoretical density slowly increases with increasing "BEE", indicating that the "BEE" does not increase the gas volume, but does add to the weight of the foam. It is thus apparent that the density reduction is due to an improvement in the efficiency of the blowing agent.

Figure 2:
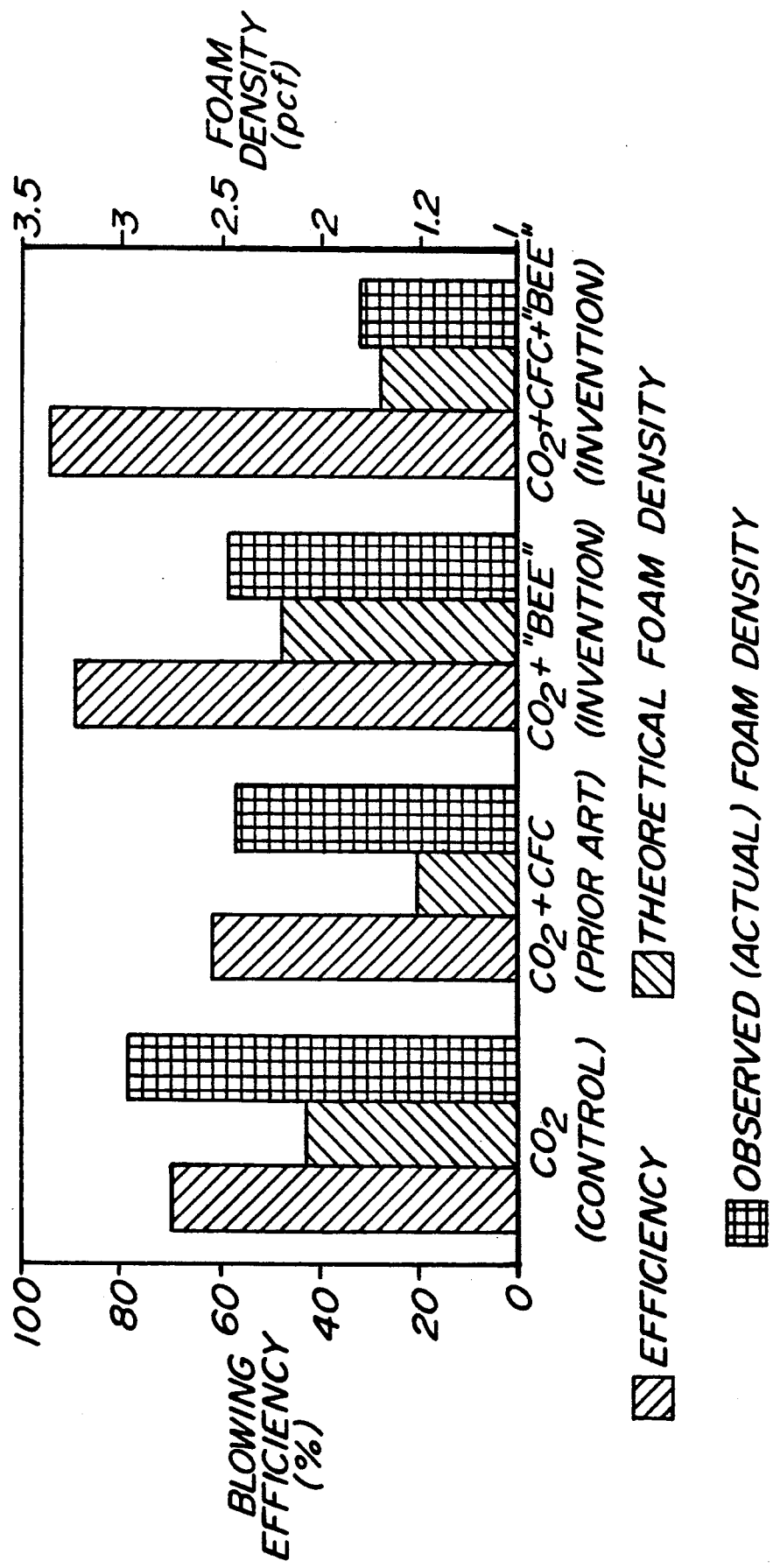
FIG. 2 is a bar chart illustrating the improved blowing efficiency of the invention over that of the prior art.

In FIG. 2, a comparison of the blowing efficiencies was made using the actual foam densities and corresponding theoretical densities. A control sample shows an actual density of about 3 pcf, a theoretical density of about 2 pcf, and a blowing efficiency of 70%. Using CFC's, as shown in the second set of bars in the bar chart labelled "Prior Art", the density can be lowered to about 2.5 pcf with the addition of 12 php CFC (F-11), but with lowered blowing efficiency of about 62% (Ex #1 sample #2). The third set of bars in the bar chart, representing the invention, show that with 5 php of the "BEE" of Example I, sample #3 the amount required to obtain the same density reduction as obtained with 12 php CFC, the blowing efficiency was 89% (a 30% improvement over use of CFC's alone). As shown in the last set of bars, the addition of CFC, or a substitute, e.g. HCFC, to a formulation made according to the invention can result in even greater efficiency, about 94%, with a reduction of actual density of 1.8 pcf.

Figure 3:
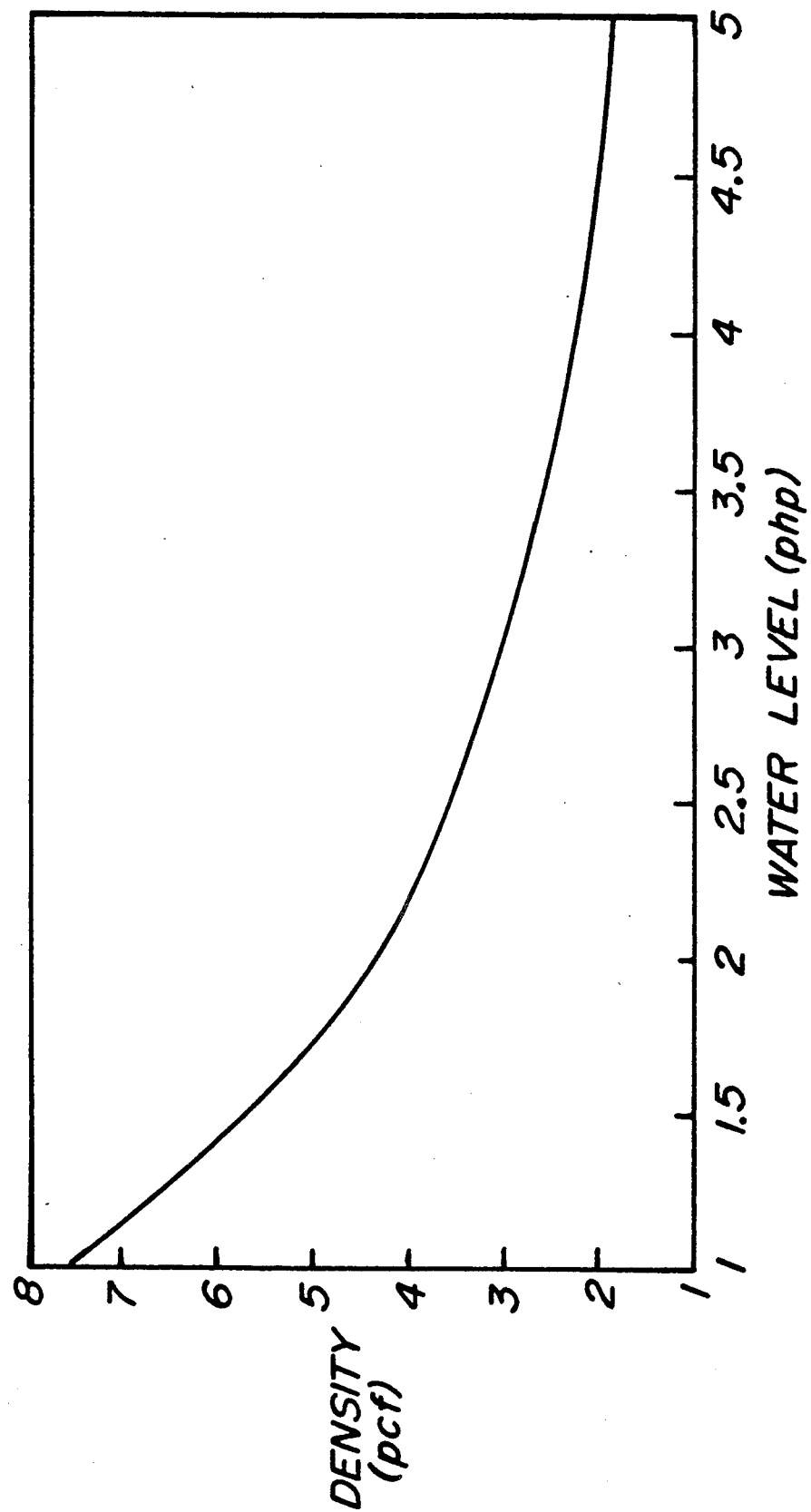
FIG. 3 is a plot of observed density vs. the water level in the foam formulation.

From experiments similar to Examples I and II, it was determined that the density decreases with increasing water level in the formulation in the range of 1 to 5 php water in a direct relationship as shown in FIG. 3. In these experiments, 5.0 php of the "BEE" of Example I and the same isocyanate (ISO80) at an Index of 100 were used. Optionally, a CFC or an HCFC could be added to further reduce the density beyond that effected by the "BEE", i.e., to 3.0 pcf or lower at water levels of 2.5 to 5 php. However, in the preferred mode of the invention, in which the humid aged compression set value (HACS) is not excessive, the water level in the formulation is from 3 to 4 php.

Figure 4:
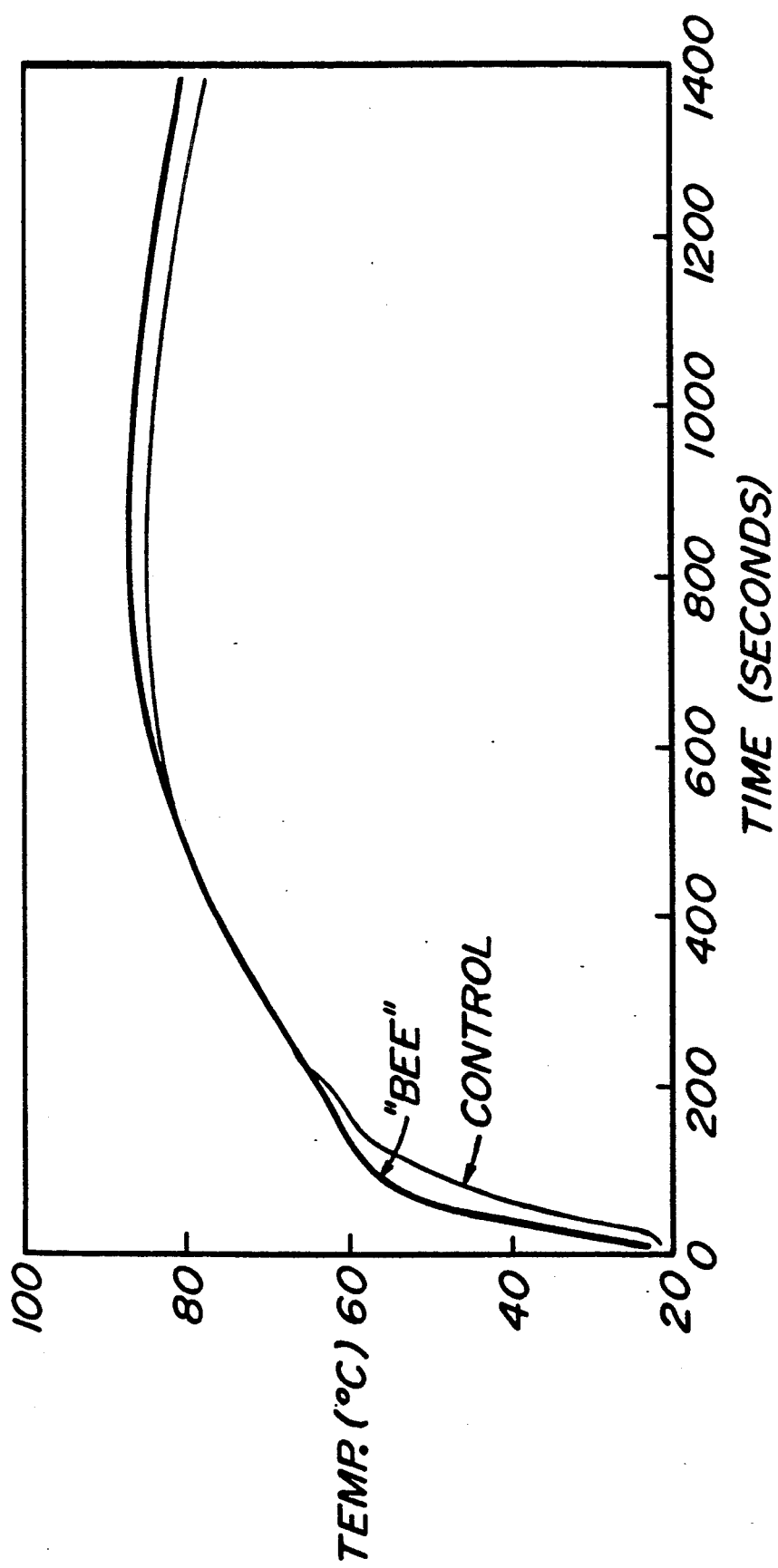
FIG. 4 illustrates the exotherm obtained by practicing the invention.

While not wishing to be bound by the following theoretical explanation, we believe that the "BEE" in our formulation reacts to increase the reaction exotherm, especially in the early stages of the reaction, which, in turn, leads to a quicker gelling (or at least thickening) of the foam mixture. This effectively traps the $CO_2$ longer in the foam cells, thereby leading to higher rise and lower density. FIG. 4 depicts the data obtained from the continuous monitoring of the reaction exotherm of an MDI-based foam reaction control and the reaction exotherm of a similar formulation containing the blowing efficiency enhancing diamine of Example I. The formulation of the invention shows a significantly higher exotherm in the initial rise of the foam than the control. It is hypothesized that the higher exotherm results from a faster reaction producing more heat leading to faster $CO_2$ generation and a steeper gelling profile in the early stages of the gelling (or rise) time, which retains the $CO_2$ bubbles inside the foam longer and thus utilizes a greater percentage of the $CO_2$ produced, lowering the density of the foam. Another scenario that could occur simultaneously is that the higher heat simply increases the volume of the gas present early in the reaction when the matrix is forming.

We believe the exotherm results from the reaction between the MDI-based diisocyanate and the specific secondary amines used in the invention which produces substituted urea linkages, —NH—CO—NR—, which, due to steric hindrance, block or at least partially prevent hydrogen bonding of the —NH— group. Calculation of the major types of carbonyl bonds in the hard segment of polyurethanes were made based on the formulations of a control, sample #A, a sample, B, containing 5 php of the blowing efficiency enhancer of the invention and an identical sample, C, containing 12 php of a CFC, F-11. The number of bond types, and therefore the calculations, for the A and C are identical. The three major types of carbonyl bonds are:

| —NH—CO—O— | —NH—CO—NR— | —NH—CO—NH— |
|---|---|---|
| (urethane) | (substituted urea) | (urea) |
| (a) | (b) | (c) |

Based on the parts per hundred parts of polyol of each component used, the number of equivalents used per 100 parts polyol were determined. (Each equivalent of each component is capable of producing one equivalent of a certain type of carbonyl bond.) The theoretical percent of each carbonyl bond type in the hard segments, i.e., the number of equivalents of that bond type divided by the total number of carbonyl bond type equivalents X 100, was calculated. It was assumed that the bond type contribution of the polyol to the hard segment is negligible. The percentages of allophanate and biuret formation, being small in comparison to the above bond types and also a constant for foams with or without the "BEE", were ignored.

| COMPONENT FORMING BOND | R (wt.) | EQUI-VALENTS | BOND TYPE a | b | c |
|---|---|---|---|---|---|
| | | | WITH "BEE" | | |
| H₂O | 3.7 | 0.411 | — | — | 89.9 |
| Diethanolamine (DEOA) | 0.5 | 0.014 | 2.1 | 1.0 | — |
| "BEE" (R = sec-butyl, R₂, R₃ = H) | 5.0 | 0.032 | — | 7.0 | — |
| | | | CONTROL AND CFC-CONTAINING SAMPLES | | |
| H₂O | 3.7 | 0.411 | — | — | 96.7 |
| Diethanolamine (DEOA) | 0.0 | 0.014 | 2.2 | 1.1 | — |
| "BEE" (R = sec-butyl, R₂, R₃ = H) | 0.0 | 0 | — | — | — |

As calculated above, the substituted urea bond (type "b") contributed by the bulky sec-butyl group of the "BEE", makes up about 7% of the carbonyl-type bonding in the hard segments. This difference in the ratio of bond types in the hard segment should show up in the carbonyl region of the IR and the effect should also be present in the N—H region of the spectrum as non-hydrogen bonded N—H. Space filling molecular models representing the urea bond and the sec-butyl substituted urea bond show dramatic differences in steric hindrance near the carbonyl. As a result of the steric hindrance in the sec-butyl substituted urea bond, hydrogen bonding between the N-hydrogen and the carbonyl groups (both from the isocyanate) appears to be significantly weakened. This is probably due to the —N—H. . .O=C— interaction being forced out of the plane of the aromatic ring of the isocyanate to which it is attached.

The "BEE" used in the above calculations was N,N'-di-sec-butyl-4,4'-diaminodiphenylmethane. The urethane matrix is typically described as being made up of hard and soft segments. The hard segments are made up of aromatic groups and the more polar groups (such as amines, amides, urethanes, ureas, etc.). The soft segments which give the foam its elastic effect are composed of the less polar groups such as the long chain polyols in the urethane backbone. Since the "BEE" contains two longer chain alkyl groups which will be in the hard segment, these normally soft segment components are expected to lead to hard segments which differ from those of the other two foams.

One can calculate the theoretical percent of these hard segments by assuming that all of the isocyanate, water, DEOA (a polar cross-linker), and "BEE" make up the hard segments. The oxygen atoms of the long chain polyol attached to the isocyanate groups are also included as part of the hard segments. The rest of the long chain polyol is considered to make up the soft segment. The percentage of hard segment was determined for each sample, with the following results:

| FOAM | PERCENT |
|---|---|
| with "BEE" | 48.2 |
| with CFC(F11) | 45.3 |
| Control | 45.3 |

The difference between the amount of hard segments of the foams with and without the "BEE" is small, but the effect on density is substantial. This density reduction has also been accomplished without any detrimental effects on the other physical properties.

Figure 5:
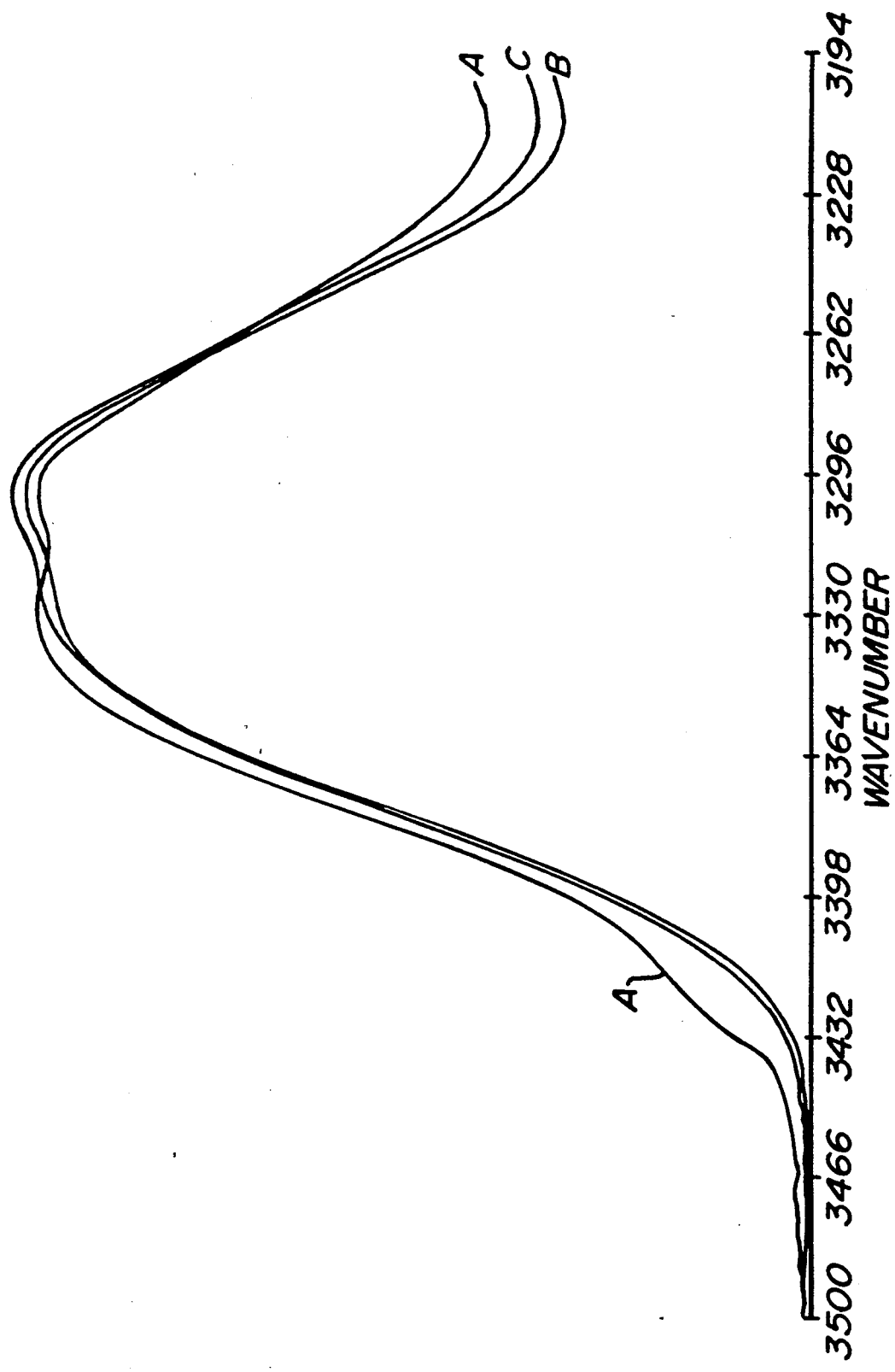
FIG. 5 is a plot comparing the IR spectrum of the invention, a control and a foam containing a CFC.

The above foams were also analyzed by attenuated total reflectrance infrared spectroscopy (ATR-IR). FIG. 5 shows the wave number spectrum of the samples in the region of 3194 $cm^{-1}$ to 3500 $cm^{-1}$. A peak around 3450 $cm^{-1}$ (slightly displaced in FIG. 4 to about 3430 $cm^{-1}$) was assigned to N—H which is not hydrogen bonded (Lee et al., *Macromolecules*, 20 (1987), page 2089). Only the foam of the invention (A) showed this peak. It is believed that the secondary diamine of the invention reacts to form a tertiary amine and also creates an additional amount of steric hindrance around the carbonyl of the isocyanate group with which is reacted. This appears to cause interference with the hydrogen of the isocyanate group in its effort to form a strong hydrogen bond with another carbonyl. The N—H region for the other two samples are almost identical, indicating that they have the same matrix. The CFC lowers the density of the foam, but it does not affect the chemical structure of the foam.

Theoretically, it is possible that the structure of the diamine of the invention contributes to the reduction of density by other mechanisms. The first such mechanism is that the "BEE's" are weak catalysts. This could be adding to the heat of the reaction, increasing the exotherm in the foam. It is also possible that the surface tension of the foam's cells is increased enabling the bubbles to be maintained for a longer time. However, these effects are believed to be minor compared to the heat of the reaction of the "BEE" in the foam and the molecular structure of the foam product.

While it may be possible to increase the exotherm of the reaction by increasing the level of typical foam catalysts, providing the appropriate balance between the blowing reaction and the gelling reaction is maintained, this technique usually leads to worse compression sets, especially humid aged compression sets. Various other physical properties can also be hurt with higher catalyst levels. In some cases, the foams may show splits, lower resiliency, and/or higher shrinkage. However, when the density is lowered using the invention, the physical properties are essentially unchanged or improved.

The alkylated diamines used in this invention typically are prepared by conventional alkylation procedures performed on the precursor primary amine. The amino groups may be at either the 2, 3, or 4 position in the diamine. However, it is desirable that both of the terminal amino groups occupy the 4-position. A major advantage arises from the ease of synthesis of such materials, although it is not to be implied that there are no differences in such materials as used in this invention.

Defining an equivalent of diamine or polyol as an amount which furnishes as many amino groups or hydroxyl groups, respectively, as there are isocyanate groups in the mixture, from about 0.70 to about 1.3 equivalents total of the backbone polyol, short chain polyol, if used, and our diamine are used in the invention, with the range from about 0.85 to about 1.15 more frequently used, and from about 0.90 to about 1.0 being the more usual one. As noted above and elaborated upon below, the curing mix may contain other materials, including other isocyanate-reactive components such as chain extender or cross-linking polyols and polyamines, in addition to the diamines of this invention, although the presence of such materials may not be necessary to the success of this invention.

Catalysts are needed in making foams to decrease the reaction time in order to obtain a mixture which sets sufficiently rapidly to conform to the foam process requirements. Tertiary amines such as triethylamine, tributylamine, N-ethylmorpholine, ,1,4-diaza-bicyclo-(2,2,2)-octane, N-methyl-N'-dimethylaminoethyl-piperazine, N,N-dimethylbenzylamine, N,N-dimethylcyclohexylamine, and 1,2-dimethylimidazole are usually the primary catalysts used in foams. Organic tin compounds may also be used and include such materials as the tin(II) salts of carboxylic acids such as tin(II) acetate, tin(II) octoate, tin(II) ethylhexoate and tin(II) laurate, as well as such materials as the dialkyl tin salts of carboxylic acids as exemplified by dibutyltindiacetate, dibutyltindilaurate, dibutyltinmaleate, and dioctytindiacetate. Such tin salts may be used either alone or as a complex with amidines such as amino pyridines, amino pyrimidines, hydrazino pyridines, and tetrahydropyrimidines. Other catalysts based on metals, such a lead, iron, mercury, bismuth, cobalt and manganese also have been used, and include compounds such as cobalt (III) acetylacetonate, cobalt naphthoate, manganese naphthoate, lead oleate, zinc naphthenate and zirconium naphthenate. These catalysts are generally used in an amount from about 0.01 to about 10% by weight, preferably from about 0.05 to about 1.0% by weight, based on the quantity of polyisocyanate and the quantity of materials reacting with the polyisocyanate.

The mixture of isocyanate-reactive components also may contain other materials, such as surfactants. Examples of surfactants include the sodium salts of sulfonates or of fatty acids, amine salts of fatty acids, alkali metal or ammonium salts of sulfonic acids, polyether siloxanes, and the like. The component mixture also may contain pigments, dyes, flame retardants, stabilizers, plasticizers, fungicides and bactericides, and fillers.

EXAMPLES

General Preparation of the Polyurethane Foams. The procedure illustrates formulations based on the one-shot method; however, with minor modifications, it can be used in a 2-stage process when MDI-base prepolymers are employed instead of MDI monomers. The MDI-based isocyanate, ISO-80, a widely used isocyanate for foams which is a mixture of MDI monomer and polymeric MDI (PMDI) is used to illustrate the invention, but other MDI-based isocyanates are available and may be used in the invention. The functionality is about 3.0.

Laboratory Scale

The polyol(s), the diamine(s) of the examples, catalysts, foam stabilizers, water, other blowing agents, if any, and other additives were mixed together thoroughly with a high shear stirring paddle at 2250 rpm in a quart-sized unwaxed cup. The polyisocyanate, weighed out separately, was then added to the cup containing the mixture of isocyanate-reactive components and was thoroughly blended for 8 seconds. This mixture was poured into a cardboard box and allowed to rise. The cream time and rise time were recorded. The foam samples, after rising, were placed in an oven at 100° C. for 10 mins., crushed in both directions, and after 3 days were cut into appropriate sized specimens. These samples were allowed to post-cure for 3 days at room temperature. Exotherms were determined in the same way except that the reaction was conducted in the quart cup with a thermocouple inserted into the mass. Other reaction and curing conditions may be used depending on the reaction components and the reaction conditions. The index is the ratio of the actual amount of isocyanate used in the formulation to the theoretical amount required by the amount of isocyanate-reactive ingredients.

Large Scale

The formulations below may also be used on a large scale by using low and high pressure foam machines, mixing machines which may or may not be attached to sprayers, and reaction injection molding machines.

Mechanical Properties

The mechanical properties of the foams produced in the following examples are determined by the ASTM method No. D3574-86 (1986) which includes the standard tests for density, tensile strength, elongation, tear strength, compression force deflection (CFD), SAG factor, dry compression set, and humid aged compression set. SAG is defined as the ratio of CFD at 65% deflection to CFD at 25% deflection. The test method for CFD was modified by continuously recording the values, from which the values at 65% and 25% were obtained, on a test sample measuring 5.1 cm×3.8 cm high which had been preflexed twice to 80% deflection at a rate of 5.08 cm per minute and allowed to recover for 10 minutes. The compression rate in the test was also 5.08 cm/min.

EXAMPLE I

Each of the following formulations (except the control sample #1) in Table 1 were used to make a low density flexible foam having low hardness. The formulation of Sample 2 used a CFC (F11A) to obtain the desired results. Samples 3 through 5 use varying amounts of the diamine of the invention to obtain properties comparable to those produced in Sample 2, but without using a CFC. In Samples 6 and 7 a diamine of the invention was combined with a CFC and an HCFC, respectively.

TABLE 1

Components (part weight per hundred parts polyol by weight)(php)

| | Sample No. | | | | | | |
|---|---|---|---|---|---|---|---|
| | #1 | #2 | #3 | #4 | #5 | #6 | #7 |
| Polyethertriol (Pluracol 380-BASF) | 100 | 100 | 100 | 100 | 100 | 100 | 100 |
| Water | 3.7 | 3.7 | 3.7 | 3.7 | 3.7 | 3.7 | 3.7 |
| Tertiary amine catalyst (Niax C-174-Union Carbide Corp.) | 0.6 | 0.6 | 0.6 | 0.6 | 0.6 | 0.6 | 0.6 |
| Triethylene amine Catalyst (Dabco 33LV) | 0.3 | 0.3 | 0.3 | 0.3 | 0.3 | 0.3 | 0.3 |
| Diethanol amine Catalyst (DEOA Union Carbide Corp.) | 0.5 | 0.5 | 0.5 | 0.5 | 0.5 | 0.5 | 0.5 |
| Surfactant (B-4690-available from Goldschmidt Chem. Corp. | 0.7 | 0.7 | 0.7 | 0.7 | 0.7 | 0.7 | 0.7 |
| Freon 11A (CFC) | — | 12 | — | — | — | 12 | — |
| HCFC-123 | — | — | — | — | — | — | 6.5 |
| HCFC-141b | — | — | — | — | — | — | 5.2 |
| N-N'-di-sec-butyl-methylene diphenyl-diamine (Unilink 4200 available from UOP) | — | — | 5.0 | 5.0 | 3.0 | 5.0 | 5.0 |
| Poly-methylene diphenyl diisocyanate PMDI (ISO 80-BASF)(Index 100) | 78.4 | 78.4 | 83.7 | 83.7 | 81.6 | 83.7 | 83.7 |

The results are shown in Table 2. As can be seen, the N,N'-di-substituted methylene diphenyl diamine-containing formulation lowers the density and the hardness of the foam (as measured by CFD or IFD) comparably to the CFC-containing formulation, showing that addition of the diamine of the invention can result in elimination of CFC's. The tensile strength of the foam sample #5 was about the same as the control (#1)) and the CFC-containing sample (#2). The other properties were all similar to the control or at least no worse than the CFC-containing sample, except humid aged compression set was a little higher.

TABLE 2

FOAM PROPERTIES

| | Sample No. | | | | | | |
|---|---|---|---|---|---|---|---|
| | #1 (control) | #2 | #3 | #4 | #5 | #6 | #7 |
| Cream Time (Sec) | 10 | 10 | 10 | 10 | 10 | 10 | 10 |
| Rise Time (Sec) | 115 | 130 | 140 | 150 | 140 | 150 | 150 |
| Tack Free Time (Sec) | — | — | — | — | — | — | — |
| Density (pcf) | 2.97 | 2.44 | 2.43 | 2.56 | 2.5 | 1.87 | 1.9 |
| Tensile (psi) | 27 | 25 | 22 | 20 | 23 | 14 | 16 |
| Elongation (%) | 89 | 81 | 89 | 60 | 83 | 83 | 100 |
| Tear Strength (pli) | 2.0 | 2.0 | 2.1 | 2.6 | 2.0 | 2.0 | 1.8 |
| Compression Set, Dry (%) | 9.8 | 14 | 9.8 | 12 | 13 | 18 | 14 |
| Compression Set, Humid Aged (HACS) (%) | 16 | 22 | 24 | 28 | 27 | 38 | 25 |
| CFD at 25% | 0.89 | 0.52 | 0.46 | 0.61 | 0.60 | 0.25 | 0.23 |
| CFD at 65% | 2.12 | 1.27 | 1.17 | 1.69 | 1.46 | 0.62 | 0.57 |
| SAG (CFD$_{65}$/CFD$_{25}$) | 2.4 | 2.4 | 2.5 | 2.8 | 2.4 | 2.5 | 2.5 |

EXAMPLE II

Another series of foams was made in which the "BEE" of Example I was added in amounts of 0, 1.0, 3.0, 5.0, 7.0, 9.0; and 11.0 parts per hundred parts of the polyol (Pluracol 380). The water level was 3.7 php. The effect of the level of "BEE" is shown in FIG. 1. The formulations and properties of the foams produced are set forth in the following Table 3.

TABLE 3

| | Sample No. | | | | | | |
|---|---|---|---|---|---|---|---|
| Component | 1 (control) | 2 | 3 | 4 | 5 | 6 | 7 |
| Pluracol 380 | 100.0 | 100.0 | 100.0 | 100.0 | 100.0 | 100.0 | 100.0 |
| Water | 3.7 | 3.7 | 3.7 | 3.7 | 3.7 | 3.7 | 3.7 |
| Niax C-174 | 0.6 | 0.6 | 0.6 | 0.6 | 0.6 | 0.6 | 0.6 |
| Diethanolamine (DEOA) | 0.5 | 0.5 | 0.5 | 0.5 | 0.5 | 0.5 | 0.5 |
| Dabco 33-LV | 0.3 | 0.3 | 0.3 | 0.3 | 0.3 | 0.3 | 0.3 |
| B-4690 | 0.7 | 0.7 | 0.7 | 0.7 | 0.7 | 0.7 | 0.7 |
| Unilink 4200 | 0.0 | 1.0 | 3.0 | 5.0 | 7.0 | 9.0 | 11.0 |
| ISO 80a | 78.38 | 79.45 | 81.60 | 83.74 | 85.88 | 88.03 | 90.17 |
| Index | 100 | 100 | 100 | 100 | 100 | 100 | 100 |
| Cream Time (sec) | 10 | 10 | 10 | 9 | 9 | 9 | 8 |
| Rise Time (sec) | 130 | 125 | 140 | 132 | 126 | 130 | 110 |
| Density (pcf) | 2.96 | 2.67 | 2.49 | 2.46 | 2.59 | 2.76 | 3.03 |
| Tensile strength (psi) | 26 | 26 | 23 | 24 | 24 | 24 | 32 |
| Elgonation (%) | 86 | 87 | 83 | 80 | 85 | 75 | 75 |
| Tear Strength (pli) | 2.2 | 2.3 | 2.0 | 2.0 | 1.9 | 1.9 | 2.1 |
| Compression Set Dry (%) | 12 | 11 | 13 | 18 | 17 | 11 | 17 |
| Humid Aged Compression Set (HACS (%) | 20 | 20 | 27 | 34 | 35 | 29 | 33 |
| CFD at 25% (psi) | 0.91 | 0.73 | 0.60 | 0.50 | 0.50 | 0.55 | 0.72 |
| CFD at 65% (psi) | 2.18 | 1.82 | 1.46 | 1.33 | 1.41 | 1.64 | 2.06 |
| SAG | 2.4 | 2.5 | 2.4 | 2.7 | 2.8 | 3.0 | 2.9 |

What is claimed is:

1. A method for making a low density polyurethane foam having a density below 3.0 pcf, and a compression force deflection value (CFD) at 25% of about 0.2 to about 0.75, without the addition of chlorofluorocarbons, comprising reacting an MDI-based composition consisting of at least 90 wt. % of (a) one or more organic polyisocyanates selected from the group consisting of methylene diphenyl diisocyanate (MDI), a polymer of methylene diphenyl diisocyanate (PMDI) and derivatives thereof or mixtures thereof, (b) a backbone component selected from the group consisting of polyols (c) water and (d) from about 1 to 9 parts per hundred (php) by weight, based on 100 parts of total backbone polyol, of an N,N'-disubstituted aromatic diamine of the structure,

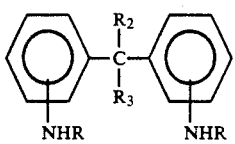

where R is selected from the group consisting of a monovalent sec- or tert- alkyl, alkenyl moiety containing from 3 to about 20 carbon atoms, or a monovalent aryl moiety from 6 to about 10 carbon atoms, $R_2$ is H or $C_1$, $C_2$ or $C_3$ alkyl and $R_3$ is H or $C_1$ to $C_6$ alkyl.

2. The method of claim 1 wherein said backbone polyol has a molecular weight of 150 to 8000.

3. The method of claim 1 wherein the ratio of the number of equivalents of isocyanate reactive components to equivalents of isocyanate is between about 0.70 and 1.3.

4. The method of claim 3 wherein said ratio is between about 0.85 to about 1.05.

5. The method of claim 1 wherein said diamine constitutes about 3 to about 6 php (wt.).

6. The method of claim 1 wherein said foam has a density of from about 0.8 to 3.0 pcf.

7. The method of claim 1 wherein the alkyl moiety is a secondary alkyl moiety.

8. The method of claim 1 wherein the alkyl moiety is sec-butyl.

9. The method of claim 7 wherein both of the amino groups are at the 4-position of the aromatic ring.

10. The method of claim 1 wherein said MDI-based composition is substantially pure.

11. The method of claim 1 wherein said water is present in the reaction mixture at concentration of from 1 to about 5 parts per hundred total polyol.

12. The method of claim 11 wherein said water is present in the reaction mixture at concentration of from 2.5 to about 5 parts per hundred total polyol.

13. The method of claim 11 wherein said water is present in the reaction mixture at concentration of from 3 to about 4 parts per hundred total polyol.

14. The product of the method of claim 1.

15. A chlorofluorocarbon-free polyurethane foam blown with a blowing efficiency of at least 75%, based on the theoretical amount of $CO_2$ produced from the reaction of water and an MDI-based isocyanate having
 a. a density of 0.8 to 3 pcf,
 b. a (CFD) compression force deflection value of 0.2 to 0.75 psi at 25% deflection and 1.0 to 2.0 psi at 65% deflection, and
 c. having a molecular structure wherein a portion of the amine hydrogens in the hard segment are free from hydrogen bonding as determined by infrared spectroscopy (peak at about 3450 $cm^{-1}$) and hard segments containing various amounts of sec- or tert- alkyl substituted urea groups.

16. The polyurethane foam of claim 15 wherein said substituted urea groups are alkylated with sec-butyl groups.

17. A molded article made by the method of claim 1.

18. A molded article comprising the foam of claim 15.

* * * * *